US012570024B2

(12) United States Patent
Li et al.

(10) Patent No.: US 12,570,024 B2
(45) Date of Patent: Mar. 10, 2026

(54) UNDER-WIRE SPRAY CLEANING DEVICE FOR WIRE CUTTING MACHINE

(71) Applicant: TCL ZHONGHUAN RENEWABLE ENERGY TECHNOLOGY CO., LTD., Tianjin (CN)

(72) Inventors: Yannan Li, Tianjin (CN); Pengfan Bi, Tianjin (CN); Chuanling Ai, Tianjin (CN); Yi Sun, Tianjin (CN); Shaohua Fu, Tianjin (CN); Yue Zhang, TianJin (CN); Hongxia Cen, Tianjin (CN); Chao Xin, Tianjin (CN); Hui Wei, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 212 days.

(21) Appl. No.: 18/555,524

(22) PCT Filed: Jul. 31, 2023

(86) PCT No.: PCT/CN2023/110430
§ 371 (c)(1),
(2) Date: Oct. 15, 2023

(87) PCT Pub. No.: WO2024/103845
PCT Pub. Date: May 23, 2024

(65) Prior Publication Data
US 2025/0073955 A1 Mar. 6, 2025

(30) Foreign Application Priority Data
Nov. 16, 2022 (CN) ......................... 202223042595.6

(51) Int. Cl.
*B28D 5/00* (2006.01)
*B28D 5/04* (2006.01)

(52) U.S. Cl.
CPC ............ *B28D 5/0076* (2013.01); *B28D 5/045* (2013.01)

(58) Field of Classification Search
CPC .............................. B28D 5/0076; B28D 5/045
See application file for complete search history.

(56) References Cited

U.S. PATENT DOCUMENTS

2011/0045656 A1* 2/2011 Lim ..................... B28D 5/0094 83/648
2012/0006312 A1* 1/2012 Grumbine ............ B28D 5/0076 125/21

(Continued)

FOREIGN PATENT DOCUMENTS

CN 206484750 U 9/2017
CN 210679212 U 6/2020

(Continued)

OTHER PUBLICATIONS

International Search Report in International application No. PCT/CN2023/110430,mailed on Sep. 22, 2023.

(Continued)

*Primary Examiner* — Omar Flores Sanchez
(74) *Attorney, Agent, or Firm* — PV IP PC; Wei Te Chung

(57) ABSTRACT

The present disclosure provides an under-wire spray cleaning device for a wire cutting machine including: a spray assembly connected to a trough body, wherein the trough body is entirely disposed in an engaging slot of a nozzle pipe device; wherein the spray assembly includes first nozzles disposed on an inside of the trough body and second nozzles disposed on an outside of the trough body, the first nozzles are configured to clean a feed machine and a clamping mushroom head, and the second nozzles are configured to clean a sheave of the outside of the trough body. An advantage of the present disclosure is changing manually (Continued)

cleaning to cleaning by a spray device, which drastically improves cleaning efficiency and also prevents influence of human factors to cleanliness of the machine.

14 Claims, 1 Drawing Sheet

(56) References Cited

U.S. PATENT DOCUMENTS

| | | | | |
|---|---|---|---|---|
| 2012/0132188 | A1* | 5/2012 | Dechant-Wagner | B28D 5/0076 125/35 |
| 2013/0022516 | A1* | 1/2013 | Kemper | B01D 11/023 422/268 |
| 2013/0206163 | A1* | 8/2013 | Zavattari | B08B 3/12 134/1 |
| 2019/0184603 | A1* | 6/2019 | Kim | B28D 5/0082 |
| 2019/0389091 | A1* | 12/2019 | Chen | H01L 21/67028 |
| 2020/0030928 | A1* | 1/2020 | Terada | B23Q 3/1554 |
| 2020/0171706 | A1* | 6/2020 | Liu | B28D 5/0076 |
| 2022/0410434 | A1* | 12/2022 | Lee | B28D 5/045 |
| 2023/0271285 | A1* | 8/2023 | Misaizu | B28D 5/0076 |
| 2023/0298881 | A1* | 9/2023 | Okamura | B28D 5/0076 134/1.3 |
| 2023/0381906 | A1* | 11/2023 | Takenouchi | B23Q 11/02 |
| 2025/0083357 | A1* | 3/2025 | Wang | B28D 5/045 |

FOREIGN PATENT DOCUMENTS

| | | |
|---|---|---|
| CN | 211464060 U | 9/2020 |
| CN | 112718690 A | 4/2021 |
| CN | 214163579 U | 9/2021 |
| CN | 218902847 U | 4/2023 |
| JP | 2003203884 A | 7/2003 |

OTHER PUBLICATIONS

Written Opinion of the International Search Authority in International application No. PCT/CN2023/110430,mailed on Sep. 22, 2023.

* cited by examiner

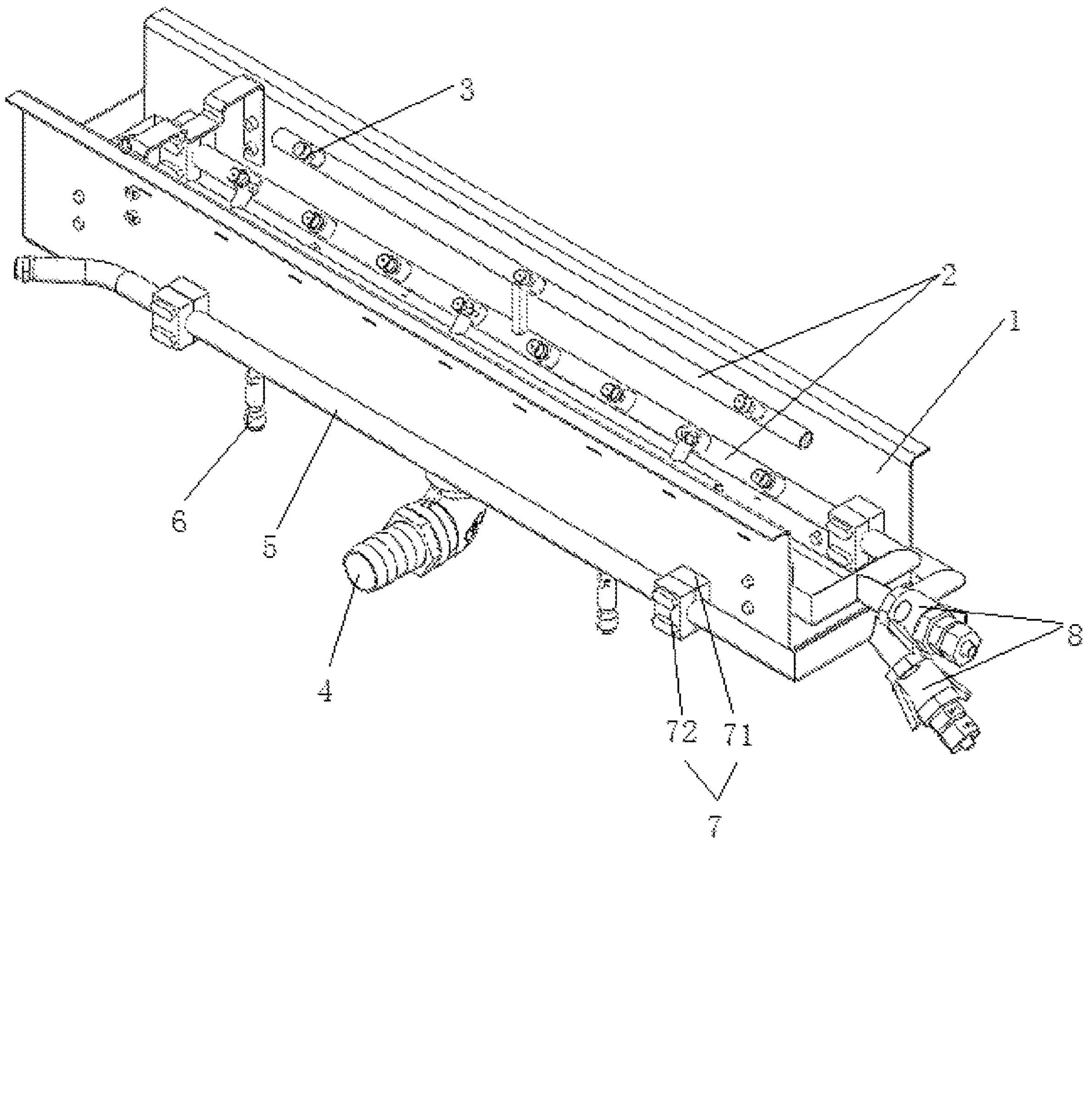
3
2
1
6
5
4
8
72
71
7

UNDER-WIRE SPRAY CLEANING DEVICE FOR WIRE CUTTING MACHINE

CROSS-REFERENCE TO RELATED APPLICATION

The present disclosure claims priority to and the benefit of Chinese Patent Application No. 202223042595.6, filed in the China National Intellectual Property Administration on Nov. 16, 2022, the disclosure of which is hereby incorporated by reference in its entirety.

FIELD OF DISCLOSURE

The present disclosure belongs to a field of solar wafer manufacturing technologies, especially to an under-wire spray cleaning device for a wire cutting machine.

BACKGROUND OF INVENTION

A huge amount of cut micro powders is generated during a conventional silicon wafer cutting process, and these generated micro powders would be held by a cutting fluid and be suspended in the cutting fluid by a dispersion of a coolant (coolant stock solution is added with water in a certain proportion to form a cutting fluid). A cutting process motor drives a primary roller and a diamond wire to spin at a high speed to impact liquid of a coolant and results in some of the coolant splashed onto a feed stage and a clamping mushroom head, and the splashed coolant after evaporated would leave contained silicon micro powders on the feed stage and the clamping mushroom head. To clean the remaining silicon micro powders, during an actual production process, an entire processing house is cleaned once in a constant period of time to clean important parts such as the feed stage and the clamping mushroom head. Also, cleaning is mainly implemented by a reverse osmosis (RO) water gun or a manually washing process, which consumes labor and time, and the time is longer and influences a production capacity.

SUMMARY

To solve issues, the present disclosure provides an under-wire spray cleaning device for a wire cutting machine especially suitable for cleaning an entire processing house including a feed stage and a clamping mushroom head in a silicon wafer cutting apparatus.

To solve the above technical issue, the present disclosure employs a technical solution as follows: an under-wire spray cleaning device for a wire cutting machine, comprising: a spray assembly connected to a trough body, wherein the trough body is entirely disposed in an engaging slot of a nozzle pipe device;

wherein the spray assembly comprises first nozzles disposed on an inside of the trough body and second nozzles disposed on an outside of the trough body, the first nozzles are configured to clean a feed machine and a clamping mushroom head, and the second nozzles are configured to clean a sheave of the outside of the trough body.

In some embodiments of the present disclosure, an aperture is defined in a top of the trough body, and the spray assembly is disposed on two sidewalls of the inside of the trough body.

In some embodiments of the present disclosure, the spray assembly disposed on the inside of the trough body comprises: first nozzle pipes and first nozzles, the first nozzle pipes are symmetrically disposed along an inner sidewall of the trough body, and the first nozzles are disposed on the first nozzle pipes at intervals evenly.

In some embodiments of the present disclosure, the first nozzles and the inner sidewall of the trough body form a certain included angle to clean the feed machine and the clamping mushroom head.

In some embodiments of the present disclosure, at least two of the first nozzle pipes are disposed on a sidewall of each side of the trough body, and the first nozzle pipes are connected by a pipeline; and each of the first nozzle pipes is connected to the inner sidewall of the trough body by a press-fit fastener.

In some embodiments of the present disclosure, the first nozzle pipes disposed on the inside of the trough body are connected to an external water pipe by a same connector or different connectors.

In some embodiments of the present disclosure, the spray assembly disposed on the inside of the trough body comprises: second nozzle pipes and second nozzles, the second nozzle pipes are symmetrically disposed on an outer sidewall of the trough body, and the second nozzles are disposed on the second nozzle pipes at intervals evenly.

In some embodiments of the present disclosure, the second nozzles and the outer sidewall of the trough body form a certain included angle to clean the sheave of the outside of the trough body.

In some embodiments of the present disclosure, each of the second nozzle pipes is connected to the outer sidewall of the trough body by a press-fit fastener; and the second nozzle pipes disposed on the outside of the trough body are connected to an external water pipe by a common connector or different connectors.

In some embodiments of the present disclosure, a drainage outlet is disposed on a bottom portion of the trough body.

The above employed technical solution has advantages as follows:

Changing a regular cleaning process to a machine from manually cleaning to cleaning by a spray device drastically improves cleaning efficiency and also prevents influence of human factors to cleanliness of the machine. After the improvement, disposing a nozzle pipe increases a water pressure and a spray flow in a pipe to be able to wash out various impurities to maintain cleanliness of the machine, guarantee stability of a cutting quality. Also, after the improvement, professional cleaners are not needed for cleaning, a single person can complete an operation, which drastically shortens the cleaning time and extremely improves cleaning efficiency.

DESCRIPTION OF DRAWINGS

FIG. 1 is an overall schematic structural view of the present disclosure.

LIST OF REFERENCE SIGNS

1: Trough body;
2: First nozzle pipe;
3: First nozzle;
4: Drainage outlet;
5: Second nozzle pipe;
6: Second nozzle;
7: Press-fit fastener;

-continued

| |
|---|
| 8: Common connector; |
| 71: Supporting bracket; |
| 72: Collar element. |

DETAILED DESCRIPTION OF EMBODIMENTS

The present disclosure will be described as follows in combination with embodiments and attached drawings:

The present device primarily aims at an issue that in a silicon wafer cutting device in a silicon wafer cutting process, a coolant impacts a primary roller and diamond wire rotated at a high speed by a motor in cutting process to result in some of the coolant splashed onto a feed stage and a clamping mushroom head and splashed coolant after evaporated will leave contained silicon micro powders onto the structures of the feed stage and the clamping mushroom head such that precisely cleaning is needed.

In an embodiment of the present disclosure, with reference to FIG. 1, an under-wire spray cleaning device for a wire cutting machine comprises: a trough body 1 and a spray assembly connected to the trough body 1. The spray assembly comprises first nozzles 3 disposed on an inside of the trough body 1 and second nozzles 6 disposed on an outside of the trough body 1. During a cleaning process, the entire trough body is placed in an engaging slot of a nozzle pipe device for cleaning, and then is spray-cleaned by the first nozzles 3 and the second nozzles 6 by controlling a water flow into the spray assembly. The first nozzles 3 clean important parts such as a feed machine and a clamping mushroom head, and the second nozzles 6 perform a spraying process to a sheave on an outside of the trough body. Compared to a conventional technology, after an original nozzle pipe device is detached, the engaging slot of the present cleaning device is directly installed in the engaging slot of the nozzle pipe device such that installation is more convenient and faster. Also, after the structure is washed, the engaging slot can be conveniently detached, and the nozzle pipe can be re-installed to proceed with later operations through the present device. In the present embodiment, the spray assembly can be injected with reverse osmosis (RO) water.

With reference to FIG. 1, in the present embodiment, the trough body 1 used is a rectangular trough body structure having an aperture defined in a top of the rectangular trough body structure. For convenience of supplying water to the spray assembly of the inside of the trough body 1, an aperture can also be defined in a sidewall of the trough body 1 at an inlet side, or an inlet hole is defined in the sidewall of the trough body 1 for a hose to pass through the inlet hole. The spray assembly is disposed on two sidewalls on the inside of the trough body 1. Also, a drainage outlet 4 is disposed in a bottom portion of the trough body 1 for discharging sprayed water.

In the present embodiment, the spray assembly disposed on the inside of the trough body 1 comprises: first nozzle pipes 2 and the first nozzles 3. The first nozzle pipes 2 are symmetrically disposed along an inner sidewall of the trough body 1. At least two of the first nozzle pipes 2 are disposed on the inner sidewall of each side of the trough body 1, and the same first nozzle pipes 2 are distributed on the inner sidewall of each side of the trough body 1. The first nozzles 3 are disposed on the first nozzle pipes 2 at intervals evenly.

In the present embodiment as shown in FIG. 1, the first nozzles 3 and the inner sidewall of the trough body 1 form a certain included angle. A disposing angle of the first nozzles 3 is adjusted according to locations of the feed stage and the clamping mushroom head to be cleaned such that water sprayed out from the first nozzles 3 can be targeted at the feed stage and the clamping mushroom head for washing and cleaning. Two first nozzle pipes 2 are disposed abreast on the inner sidewall of each side of the trough body 1 to make a spraying range broader. Also, the intervals among the first nozzles 3 on the two first nozzle pipes 2 can be the same or different. The two first nozzle pipes 2 are connected by a pipeline. In particular, in the present embodiment, the first nozzle pipes 2 below a height are connected to an external water pipe by a connector 8 for supplying water, and the first nozzle pipes 2 above the height are supplied with water by the first nozzle pipes 2 below the height through a pipeline. It is conceivable that a sequence of the first nozzle pipes connected to the connector 8 can be adjusted.

In the present embodiment, the first nozzle pipes 2 are connected to the inner sidewall of the trough body 1 by a press-fit fastener 7. The press-fit fastener 7 can employ the structure as shown in FIG. 1, specifically including a supporting bracket 71 and a collar element 72. The supporting bracket 71 is disposed on the trough body 1 and fastens the first nozzle pipes 2 and the press-fit fastener 7 by the collar element 72. The collar element 72 only performs a fastening function. Correspondingly, a hole is formed in a matching portion between the collar element 72 and the supporting bracket 71 to allow the first nozzle pipes 2 to pass through the hole. The first nozzle pipes 2 disposed on two sides of the inside of the trough body 1 can be connected to the external water pipe by the same or different connectors on adjacent sidewalls of the trough body 1. In the present embodiment, the first nozzle pipes 2 on two sidewalls of the inside of the trough body 1 are converged to the common connector 8 and then connected to the external water pipe, which facilitates controlling water flow in the nozzle pipe. Disposing the structures of the nozzle pipe and the nozzle achieves adjustment of water in the nozzle pipe, which increases a water pressure, facilitates washing various impurities to maintain cleanliness of the machine and guarantee stability of cutting quality.

The spray assembly disposed on the outside of the trough body 1 comprises: second nozzle pipes 5 and the second nozzles 6. The second nozzle pipes 5 are symmetrically disposed on an outer sidewall of the trough body 1. Namely, a second nozzle pipe 5 is disposed on the outer sidewall of each side of the trough body 1, the second nozzles 6 are disposed on the second nozzle pipes 5 at intervals.

In the present embodiment, the second nozzle pipes 5 disposed on the outer sidewall of the trough body 1 are disposed near the bottom portion of the trough body 1, the second nozzles 6 and the outer sidewall of the trough body 1 form a certain included angle to facilitate cleaning the sheave of the outside of the trough body.

In the present embodiment as shown in FIG. 1, a disposing angle of the second nozzles 6 is adjusted according to a location of the sheave to be cleaned such that water sprayed out from the second nozzles 6 can be targeted at the outer sheave for washing and cleaning. In the present embodiment, the second nozzle pipes 5 are also connected to the outer sidewall of the trough body 1 by the press-fit fastener 7. The second nozzle pipes 5 disposed on two sides of the outside of the trough body 1 can be converged to the same or different connectors 8 to be connected to the external water pipe. In the present embodiment, the second nozzle pipes 5 on two sidewalls of the outside of the trough body 1 are converged to the common connector 8 and then are connected to the external water pipe. The connector 8 connected to the second nozzle pipes 5 and the connector 8 connected to the first nozzle pipes 2 are disposed on the same side to facilitate controlling water flow in the nozzle pipe such that various impurities can be washed out effectively and the structure is more compact.

A working process of an embodiment of the present disclosure:

An original nozzle pipe device of the apparatus is detached, the entire trough body 1 of the present cleaning device is placed in the engaging slot of the nozzle pipe device and also communicates with the external water pipe at the connector 8. It is conceivable that a flow and pressure regulator valve can be disposed on the external water pipe. During installation, disposing angles of the first nozzles 3 and the second nozzles 6 are adjusted. A cleaning operation starts, the spray assembly of the trough body 1 is injected with water, a flow is adjusted to a maximum to clean important parts such as the feed stage, the clamping mushroom head, and the outer sheave. When cleaning is completed, the entire trough body is detached and replaced with the original nozzle pipe for a cutting operation.

Embodiments of the present disclosure are described in detail as above. However, the contents are only the preferred embodiments of the present disclosure and cannot be deemed as a limit to an embodying range of the present disclosure. Equivalent changes and improvements according to an application range of the present disclosure shall still belong to a patent coverage range of the present disclosure.

What is claimed is:

1. An under-wire spray cleaning device for a wire cutting machine, comprising: a spray assembly connected to a trough body;

wherein the spray assembly comprises first nozzles disposed on an inside of the trough body and second nozzles disposed on an outside of the trough body, the first nozzles are configured for cleaning, and the second nozzles are configured to clean a sheave of the outside of the trough body.

2. The under-wire spray cleaning device for a wire cutting machine according to claim 1, wherein an aperture is defined in a top of the trough body, and the spray assembly is disposed on two sidewalls of the inside of the trough body.

3. The under-wire spray cleaning device for a wire cutting machine according to claim 1, wherein the spray assembly disposed on the inside of the trough body comprises first nozzle pipes and first nozzles, the first nozzle pipes are symmetrically disposed along an inner sidewall of the trough body, and the first nozzles are disposed on the first nozzle pipes at intervals evenly.

4. The under-wire spray cleaning device for a wire cutting machine according to claim 3, wherein the first nozzles and the inner sidewall of the trough body form a certain included angle for cleaning.

5. The under-wire spray cleaning device for a wire cutting machine according to claim 3, wherein at least two of the first nozzle pipes are disposed on a sidewall of each side of the trough body, and the first nozzle pipes are connected by a pipeline; and each of the first nozzle pipes is connected to the inner sidewall of the trough body by a press-fit fastener.

6. The under-wire spray cleaning device for a wire cutting machine according to claim 3, wherein the first nozzle pipes disposed on the inside of the trough body are connected to a same connector or different connectors.

7. The under-wire spray cleaning device for a wire cutting machine according to claim 1, wherein the spray assembly disposed on the inside of the trough body comprises second nozzle pipes and second nozzles, the second nozzle pipes are symmetrically disposed on an outer sidewall of the trough body, and the second nozzles are disposed on the second nozzle pipes at intervals evenly.

8. The under-wire spray cleaning device for a wire cutting machine according to claim 7, wherein the second nozzles and the outer sidewall of the trough body form a certain included angle to clean the sheave of the outside of the trough body.

9. The under-wire spray cleaning device for a wire cutting machine according to claim 7, wherein each of the second nozzle pipes is connected to the outer sidewall of the trough body by a press-fit fastener; and the second nozzle pipes disposed on the outside of the trough body are connected to a common connector or different connectors.

10. The under-wire spray cleaning device for a wire cutting machine according to claim 1, wherein a drainage outlet is disposed on a bottom portion of the trough body.

11. The under-wire spray cleaning device for a wire cutting machine according to claim 8, wherein each of the second nozzle pipes is connected to the outer sidewall of the trough body by a press-fit fastener; and the second nozzle pipes disposed on the outside of the trough body are connected to a common connector or different connectors.

12. The under-wire spray cleaning device for a wire cutting machine according to claim 2, wherein a drainage outlet is disposed on a bottom portion of the trough body.

13. The under-wire spray cleaning device for a wire cutting machine according to claim 3, wherein a drainage outlet is disposed on a bottom portion of the trough body.

14. The under-wire spray cleaning device for a wire cutting machine according to claim 7, wherein a drainage outlet is disposed on a bottom portion of the trough body.

* * * * *